US012536894B2

(12) United States Patent
Katt

(10) Patent No.: US 12,536,894 B2
(45) Date of Patent: Jan. 27, 2026

(54) VIRTUAL PRIVATE CLOUD NETWORK PROVIDING EMERGENCY DATA TO EMERGENCY SERVICE NETWORKS

(71) Applicant: RapidSOS, Inc., New York, NY (US)

(72) Inventor: John Katt, New York, NY (US)

(73) Assignee: RAPIDSOS, INC., New York, NY (US)

( * ) Notice: Subject to any disclaimer, the term of this patent is extended or adjusted under 35 U.S.C. 154(b) by 77 days.

(21) Appl. No.: 18/401,574

(22) Filed: Dec. 31, 2023

(65) Prior Publication Data

US 2025/0218275 A1 Jul. 3, 2025

(51) Int. Cl.
*G08B 25/00* (2006.01)
*G08B 25/01* (2006.01)
*H04W 76/50* (2018.01)

(52) U.S. Cl.
CPC ......... *G08B 25/007* (2013.01); *G08B 25/016* (2013.01); *H04W 76/50* (2018.02)

(58) Field of Classification Search
CPC ......... H04L 12/28; H04L 12/56; H04L 12/58; H04L 9/40; H04L 29/08; H04L 63/20; H04L 67/52; H04M 7/00; H04M 7/006; H04W 4/029; H04W 4/90; H04W 4/02; H04W 4/04; H04W 36/00; H04W 76/50; G08G 1/127; G08G 1/20; G08B 27/00; G08B 27/001; G08B 25/00; G08B 25/007; G08B 25/016
See application file for complete search history.

(56) References Cited

U.S. PATENT DOCUMENTS

| 7,580,405 | B2 * | 8/2009 | Laliberte ............... | H04M 7/006 370/389 |
| 2024/0106862 | A1 * | 3/2024 | Head ....................... | H04L 63/20 |

* cited by examiner

*Primary Examiner* — Van T Trieu
(74) *Attorney, Agent, or Firm* — CYGAN LAW OFFICES PC; Joseph T. Cygan

(57) ABSTRACT

A disclosed method of operating an emergency data management system includes: obtaining emergency data related to an emergency call to an emergency communication center (ECC) by a cloud server of the emergency data management system independent from the ECC; obtaining an address for the emergency call via a connectivity device located at the ECC, where the connectivity device is operatively coupled to the cloud server; matching the address to an ECC computer-aided-dispatch (CAD) system incident record address; and sending the emergency data to the ECC CAD system incident record corresponding to the matched CAD system incident record address.

22 Claims, 8 Drawing Sheets

VIRTUAL PRIVATE CLOUD NETWORK PROVIDING EMERGENCY DATA TO EMERGENCY SERVICE NETWORKS

CROSS-REFERENCE TO RELATED APPLICATIONS

The present application claims priority to U.S. Provisional Patent Application No. 63/436,591, filed Dec. 31, 2022, entitled "VIRTUAL PRIVATE CLOUD NETWORK PROVIDING EMERGENCY DATA TO EMERGENCY SERVICE NETWORKS" which is hereby incorporated by reference herein in its entirety, and which is assigned to the same assignee as the present application.

FIELD OF THE DISCLOSURE

The present disclosure relates generally to enhanced 9-1-1 (E911) and next generation 9-1-1 (NG911) emergency networks and more particularly to methods and apparatuses for retrieving and sending data to emergency networks in a secure manner.

BACKGROUND

The evolution of emergency networks toward achieving full enhanced 9-1-1 (E911) and next generation 9-1-1 (NG911) capabilities has been arduous. Currently, most emergency networks remain a conglomeration of legacy 9-1-1 telecommunications equipment and added in components to begin creating full enhanced and next generation capabilities.

Emergency networks involve an Emergency Communication Center (ECC) which is defined by the National Emergency Number Association (NENA) as "A set of call takers operating under common management which receives emergency calls for service and asynchronous event notifications and processes those calls and events according to a specified operational policy." A specific type of ECC is a Public Safety Answering Point (PSAP) which NENA defines as an entity responsible for receiving 9-1-1 calls and processing those calls according to a specific operational policy.

ECC and PSAP call takers benefit from various software systems including call handling and call taking software, computer-aided-dispatch (CAD) systems and the like. As ECCs evolve toward advanced capabilities, new requirements for data flow in and out of the ECCs has also become a consideration.

DETAILED DESCRIPTION

Figure 1:
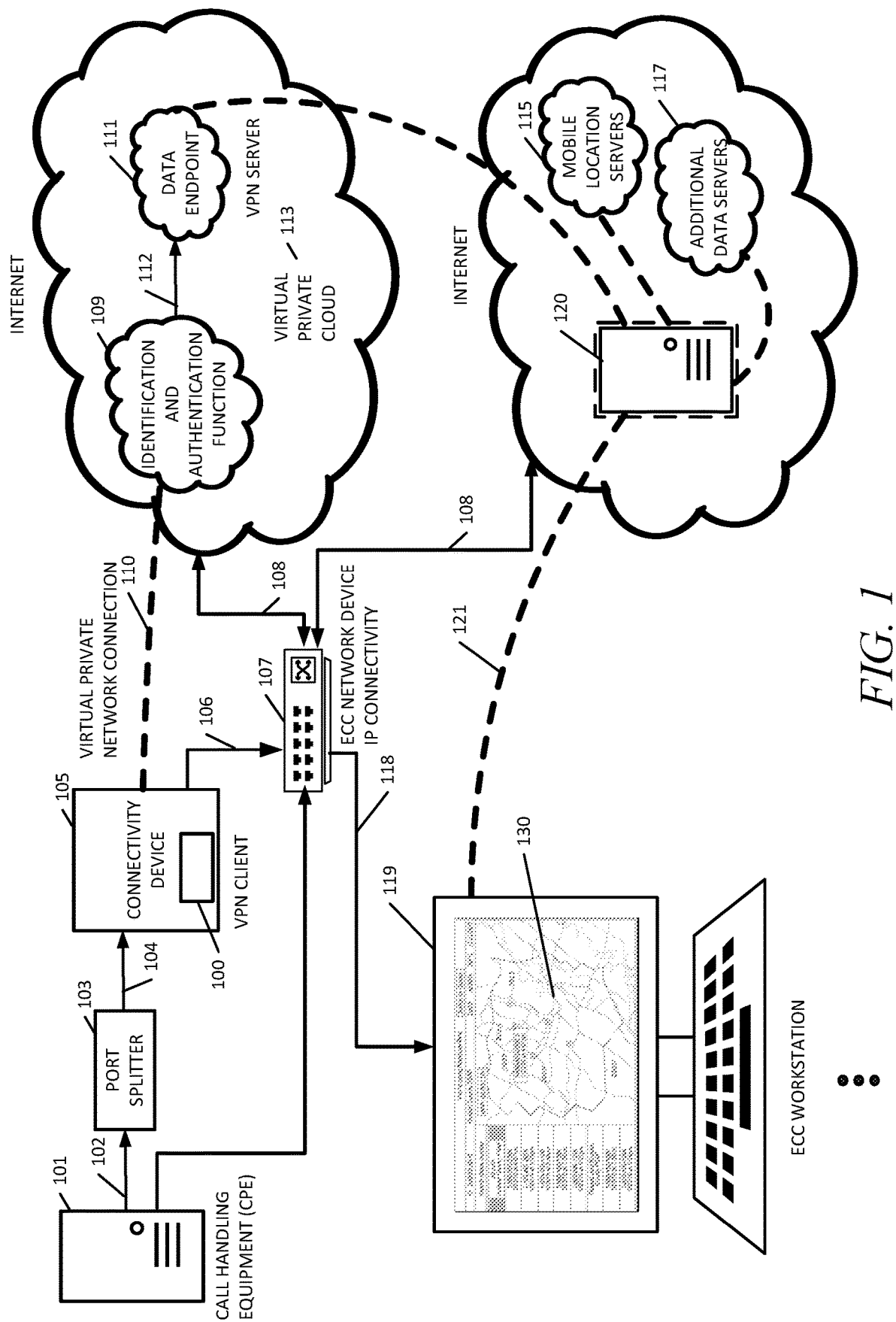
FIG. 1 is a block diagram of an Emergency Communication Center (ECC) in communication with a virtual private cloud (VPC) infrastructure and with a software-as-a-service (SaaS) emergency data management system, in accordance with an embodiment. The ECC may be a Public Safety Answering Point (PSAP).

Briefly, the present disclosure provides apparatuses and methods for creating a virtual private network (VPN) connection between an Emergency Communications Center (ECC) and a virtual private cloud (VPC) infrastructure. The VPN and VPC enable, among other things, the secure extraction of data from the ECC by cloud-based SaaS systems that provide advanced data view and information to call takers at the ECC based on the extracted data.

A disclosed method includes obtaining serial data from an functional entity of an emergency communication center (ECC); converting the serial data to packet data; establishing a virtual private network connection between the ECC and a virtual private cloud; performing an authentication procedure between the ECC and an application programming interface (API) endpoint in the virtual private cloud; sending the packet data to the API endpoint; and providing a portal graphical user interface to at least one ECC entity that displays enhanced emergency call data using the packet data.

A disclosed method of operating an emergency data management system includes: obtaining emergency data related to an emergency call to an emergency communication center (ECC) by a cloud server of the emergency data management system independent from the ECC; obtaining an address for the emergency call via a connectivity device located at the ECC, where the connectivity device is operatively coupled to the cloud server; matching the address to an ECC computer-aided-dispatch (CAD) system incident record address; and sending the emergency data to the ECC CAD system incident record corresponding to the matched CAD system incident record address.

The method may further include: populating data fields of the CAD incident record using the emergency data related to the emergency call. The method may further include: establishing a virtual private network connection between the ECC and the emergency data management system. The method may further include: establishing a virtual private network connection between the connectivity device located at the ECC, and a screened network of the ECC. The method may further include: providing an instance of a cloud application by the emergency data management system to display the emergency data in a graphical user interface (GUI). The method may further include: receiving a command via the GUI to send the emergency data to the ECC CAD system; and sending the emergency data to the ECC CAD system in response to the command. The method may further include: establishing a TCP (transport control protocol) connection between the ECC CAD system and the emergency data management system. The method may further include: establishing a TCP (transport control protocol) connection between the ECC CAD system and the connectivity device located at the ECC. The method may further include: sending the emergency data to the ECC CAD system comprising a subdomain link to a subdomain of the emergency data management system. The method may further include: establishing a virtual private network connection between the connectivity device located at the ECC, and a screened network of the ECC; performing a handshaking procedure over the VPN connection to provide credentials for the subdomain link, to implement a zero trust security model for the subdomain link. The method may further include: populating data fields of the CAD incident record using the emergency data related to the emergency call, via a module trained using machine learning.

A disclosed emergency data management system includes: a connectivity device, located at an emergency communication center (ECC) and operatively coupled to an ECC functional entity, operative to obtain an address for an emergency call from the ECC functional entity and send the address to the emergency data management system; at least one cloud server, operatively coupled to the connectivity device to receive the address, and operative to: obtain emergency data related to the emergency call to the ECC independent from the ECC; match the address to an ECC computer-aided-dispatch (CAD) system incident record address; and send the emergency data to the ECC CAD system incident record corresponding to the matched CAD system incident record address.

The cloud server may be further operative to: populate data fields of the CAD incident record using the emergency data related to the emergency call. The cloud server may be further operative to: establish a virtual private network connection between the ECC and the emergency data management system. The connectivity device may be further operative to: establish a virtual private network connection between the connectivity device located at the ECC, and a screened network of the ECC. The cloud server may be further operative to: provide an instance of a cloud application to the ECC to display the emergency data in a graphical user interface (GUI). The cloud server may be further operative to: receive a command via the GUI to send the emergency data to the ECC CAD system; and send the emergency data to the ECC CAD system in response to the command. The cloud server may be further operative to: establish a TCP (transport control protocol) connection to the ECC CAD system. The connectivity device may be further operative to: establish a TCP (transport control protocol) connection between the ECC CAD system and the connectivity device. The cloud server may be further operative to: send the emergency data to the ECC CAD system comprising a subdomain link to a subdomain of the emergency data management system. The cloud server may be further operative to: establish a virtual private network connection between the connectivity device located at the ECC, and a screened network of the ECC; and perform a handshaking procedure over the VPN connection to provide credentials for the subdomain link, to implement a zero trust security model for the subdomain link. The emergency data management system may further include an artificial intelligence module operative to populate data fields of the CAD incident record using the emergency data related to the emergency call, the artificial intelligence module trained using machine learning.

Turning now to the drawings wherein like numerals represent like components, FIG. 1 is a block diagram of an Emergency Communication Center (ECC) in communication with a virtual private cloud (VPC) 113 infrastructure and with a software-as-a-service (SaaS) emergency data management system 120, in accordance with an embodiment. The ECC may be a Public Safety Answering Point (PSAP).

The ECC includes Customer Premises Equipment (CPE) 101 which is a set of communications or terminal equipment located in the ECC or PSAP facilities. In telecommunications, the acronym "CPE" may be defined as "customer-premises equipment" or "customer-provided equipment" and refers to any terminal and associated equipment located at a telephone system subscriber's premises and connected with a telephone carrier's telecommunication circuits at a demarcation point. The demarcation point established in a building or complex, or some specific location, separates the specific customer equipment (i.e. the ECC or PSAP equipment) from other equipment located in either the distribution infrastructure or central office of the communications service provider (such as a telephone carrier).

Examples of equipment that may be included in a CPE may include, but are not limited to, active equipment and devices such as telephones, routers, network switches, gateways, networking adapters and Internet access gateways that enable the ECC to access communication services and distribute them within an ECC local area network (LAN); or passive equipment such as analogue telephone adapters (ATA) or xDSL-splitters, including various telephone systems, private branch exchanges (PBXs) etc. Some of this equipment may be devices purchased by the ECC, however some may be provided by one or more service providers that provide telecommunications or other services to the ECC. The ECC CPE may have one or more racks or chassis to encase and hold the CPE equipment and to enable cabling and interconnection via various CPE-peripherals.

One specific example equipment in an ECC CPE is an Automatic Number Identification Controller (ANI Controller) which is defined by NENA as a "stand-alone CPE component which provides the ANI decoding and function key control for 9-1-1 service." The ANI (Automatic Number Identification) refers to a telephone number (i.e. a "caller ID") associated with the access line from which a call originates, and in legacy trunked telephony lines is transmitted to an ECC on a sideband channel transmitted on a trunked line. Assuming the system is operating properly, the ECC receives an ANI number associated with a 9-1-1 emergency call as it arrives.

Procedurally, an ECC then sends an "ALI Request" which is defined by NENA as a "query for an ALI record sent from the PSAP to the ALI database." The ECC or PSAP may also perform "ALI Retrieval" which NENA defines as "the process by which a PSAP queries an ALI database with an ALI Request and receives a response with location and other available information." The term "ALI" (Automatic Location Identification) is defined by NENA as "the automatic display at the PSAP of the caller's telephone number, the address/location of the telephone and supplementary emergency services information of the location from which a call originates." The ANI and ALI data collectively may be referred to a "ANI/ALI" data.

Another specific example equipment in an ECC which may have one or more connections to the ECC CPE is a Computer Aided Dispatch (CAD) system. Nena defines CAD as "A computer based system, which aids PSAP Telecommunicators by automating selected dispatching and record keeping activities." CAD systems are used to respond to a call for service (CFS) (also referred to as an "emergency call") by creating a corresponding "incident" record, and dispatchers use the CAD system information to dispatch emergency responders to the incident address. A definition of the term "incident" is provided by APCO International. The Association of Public-Safety Communications Officials (APCO) International is the world's oldest and largest organization of public safety communications professionals, and generates standards related to public safety. One example APCO International standard is "Public Safety Communications Common Incident Types For Data Exchange," APCO 2.103.2-2019. This standard defines the term "incident" as a "real world event such as a motor vehicle accident, structure fire or illness." "Incidents may be declared by an ECC or by a unit reporting from the field." Regarding CAD systems, the standard also defines an "incident type code" as "an acronym or other abbreviated combination of alphanumeric characters used to describe the nature of the real-world event that is being reported." "Incident type codes typically differ between disparate ECCs and public safety agencies."

CAD system operators are often referred to as "dispatchers" who operate a CAD workstation to dispatch emergency responders to the location of an emergency and manage vehicles and personnel. Depending on the size of an ECC, personnel may work as both call takers and dispatchers. In that situation an ECC operator may serve as a call taker and as a dispatcher and may have access to call taking software as well as CAD software. In larger metro areas, call taking is a separate function from dispatcher and when a call taker receives a CFS (i.e. emergency call) the call taker will communicate verbally with a dispatcher to convey information related to the emergency call. The dispatcher may then access the CAD software to create an incident and populate a specialized form selected to correspond the incident based on an incident type code as described in the APCO International standard discussed above.

This is a manual process and may be prone to errors in data entry by either the call taker/dispatcher or by a dispatcher receiving information verbally from a call taker. Additionally, each ECC may use its own incident forms and may require unique incident information specific for the particular ECC. CAD incident records may include hundreds of lines of textual information that includes some information manually entered by personnel, and some information populated from the call handling system such as the ANI/ALI data. The CAD system uses various types of data for various purposes. Each CAD incident form, that corresponds to an incident type having an incident type code as described in the APCO International standard discussed above, may include unique data specific to the incident type. For example, an "industrial accident" (incident code "ACCIND") may have data related to an involved factory, machinery, hazardous materials involved or other related information. A medical emergency such as a "cardia related event" (incident code CARDIAC) may have medical data related to the specific patient. Each incident code will have specific data related to that specific incident.

Another example of CAD system data is AVL data. CAD systems generally provide operators with a view to AVL data, (Automatic Vehicle Location data), and NENA defines AVL as "A means for determining the geographic location of a vehicle and transmitting this information to a point where it can be used." More particularly, AVL data is information that is used the CAD system operators to track the location of vehicles, such as police cars, fire department vehicles, and ambulances, etc., in real-time.

AVL data may be generated by a Global Positioning System (GPS) or other location tracking systems that are installed within emergency responder vehicles. The AVL data may include, for example, a current location of a vehicle, as well as information about its speed, direction, and other information. A CAD workstation may display a map with layers of AVL data, among other layers, that therefore can be used to track the location and status of emergency responder vehicles in real-time, to provide dispatchers with information about the availability and location of resources, and to quickly see the location and status of all vehicles in the fleet. ECC dispatchers can thus use AVL information to make informed decisions about how to best deploy vehicles and personnel in response to emergency calls, alarms, etc. Reports and analytics may also be generated using AVL data, which can be used to improve the ECC operating efficiency and effectiveness, among other uses.

The ECC may obtain AVL data via a variety of networks, and emergency responder vehicles may for example, have an AVL system that is connected to a wireless modem or other device that is operative to transmit the data to the ECC over a wireless network. The wireless networks employed may be, but are not limited to: cellular networks including 5G networks, satellite networks, Wi-Fi networks, or ECC propriety wireless networks, etc. Intake of the AVL data by the ECC may then be through equipment located within the ECC CPE that is connected to the ECC local area network (LAN).

The ECC also includes "call handling" which NENA defines as "a functional element concerned with the details of the management of calls." According to NENA, call handling handles all communication from the caller and includes the interfaces, devices and applications utilized to handle the call. A "functional element" or "functional entity" is defined by NENA as "a set of software features that may be combined with hardware interfaces and operations on those interfaces to accomplish a defined task." The ECC includes an APU (Answering Position Unit) which is defined by NENA as "a term used to define call-taking equipment." The ECC workstation 119 shown in FIG. 1 may be referred to as an APU and is operatively coupled to the ECC LAN via connection 118 to the ECC network device 107. The ECC network device 107 may be, for example, a network switch or a router connected to backhaul 108 such as, for example, one or more T1 telecommunications lines or the like to provide Internet access and telephone network access to the ECC. The ECC network device 107 may be located within a rack of the CPE 101. Depending on the size of the ECC, multiple APUs such as ECC workstation 119 may be present at the ECC with each one operatively coupled to the ECC LAN and the Internet via a network connection 118 to the ECC network device 107 or to an internal ECC LAN switch or router, etc. Additionally, there may be separate APUs for call handling and CAD, or call handling and CAD software systems may be operating together on a single APU such as ECC workstation 119.

Calls received by the ECC come into the ECC via the CPE 101 and are internally switched or routed to an ECC workstation 119 (i.e. an APU) as appropriate per the specific ECC call handling operational procedures implemented by the CPE 101 and any intermediary call handling.

The term "call" as used herein comports with the NENA definition as "a generic term used to include any type of Request For Emergency Assistance (RFEA); and is not limited to voice." Therefore, the term "call" may include a session established by signaling with two-way real-time media and involves a human making a request for help." The terms "voice call", "video call" or "text call" are used herein when the specific media is of significance. As per NENA definitions, the term "call" may refer to either a "voice call", "video call", "text call" or "data-only call", since they are handled the same way through most of NG9-1-1."

In the embodiment shown in FIG. 1, a functional element of the CPE 101 is operatively coupled to a connectivity device 105. The connectivity device 105 includes several connection ports such that the connectivity device 105 is operative to connect to multiple functional elements. In some implementations, a port splitter may be employed, to enable a functional element to connect to multiple devices. In one example implementation of the FIG. 1 configuration, the functional element output may be connected to a port splitter 103 via a serial connection 102. Serial connection 102 may be a DB 9 or DB 25 type connection. A serial connection 104 may then be made between the port splitter 103 and the connectivity device 105 such that the serial connection 104 provides a serial data input to the connectivity device 105. In some embodiments, the functional element may be ANI Controller. In another embodiment the functional element may be an ANI Controller that is integrated into a call handling functional element. In yet another embodiment, the functional element may be an ANI modem bank that is operatively coupled to either a standalone ANI Controller or to an ANI Controller that is integrated into a call handling functional element. In any of these various implementations, the ANI Controller, whether standalone or integrated, and/or the ANI modem bank, may have a limited number of available serial ports. Therefore, the port splitter 103 is used when needed to accommodate providing one or more additional serial ports. Therefore, in some embodiments the serial port splitter 103 may not be required.

Another functional element of the CPE 101 that may be operatively coupled to the connectivity device 105, and that may be connected to the port splitter 103 via a serial connection 102 in some embodiments, is a functional element that receives AVL data from an emergency responder vehicle fleet and that provides the AVL data to the ECC CAD system. In some embodiments, there may be two or more port splitters employed, for example, one port splitter connected to receive serial ANI/ALI data, and another port splitter connected to receive AVL data. Likewise, in some embodiments there may be two or more connectivity devices 105 employed. For example, one connectivity device 105 may be used to receive serial ANI/ALI data, and another connectivity device may be used to receive serial AVL data. The connectivity device 105 includes serial-to-IP packet conversion capability such that it may convert received serial data to IP (Internet Protocol) packet data. The connectivity device 105 may also include IP ports and be operative to receive IP connections.

In the case of ANI/ALI data, either the port splitter 103 or an ANI Controller, Functional Element, etc., directly, provide a serial data input 104 to the connectivity device 105 which is operative to receive serialized data and convert it to packetized data for transmission over the Internet. The serial data input 104 may be a DB 9, a DB 25, or a USB connection. The connectivity device 105 is operatively coupled to the ECC network device 107 via a connection 106 which may be, for example an Ethernet cable. The ECC network device 107 provides the backhaul 108 connections to the Internet.

The connectivity device includes at least one processor 100 and software operative to implement a virtual private network (VPN) client and to establish a VPN connection 110 with a virtual private cloud (VPC) network 113, or with other network entities within the ECC, such as, for example, a CAD system. The connectivity device also includes a non-volatile, non-transitory memory component operative to store executable instructions for executing by the processor 100. For example, in some embodiments, a VPN client may be stored as executable code. Further, an authentication procedure, authentication tokens and login credentials may also be stored. In some embodiments, object-oriented programming code may be stored for execution by the processor 100.

In the various embodiments, the VPC network 113 is a virtual network that is dedicated to the use of a single ECC within the public cloud computing environment of the internet. The VPC network 113 provides the ECC with a high level of isolation from other ECCs accessing the emergency data management system 120 and also provides the ability to customize the network configuration to meet the ECC specific requirements.

Therefore, the VPC 113 is a logical representation of a network within the public cloud, and it can be used to host resources such as virtual machines, storage systems, and other resources. It allows the ECC to have a customized network environment within the public cloud, including the ability to create subnets, define network access controls, and configure security measures. Thus, the VPC 113 provides the benefits of a public cloud such as scalability and flexibility while enabling the ECC to maintain a private and secure network environment.

In some embodiments, the VPN connection is established as a client-server configuration where the connectivity device executes a VPN client on processor 100 and the VPC 113 implements a VPN server. However, in other embodiments, a VPN may be implemented as a clientless VPN.

In the embodiments employing a client-server VPN implementation, the connectivity device is operative to store a VPN client in onboard memory and to execute the VPN client on processor 100 such that, upon establishing a connection to the Internet (using the physical connection 106), the VPN client will initiate and establish the VPN connection 110 with the VPC 113. The VPN client sends data through the VPN connection 110 to the VPN server in the VPC 113 which receives and processes the data on behalf of the VPN client. The VPN client and VPN server then work together to create a secure and encrypted connection VPN connection 110 between the connectivity device and the VPC 113. The serial-to-IP-packet converter connectivity device may then send data to the data endpoint 111 such as ANI/ALI data, or CAD AVL data, other CAD data, etc.

The connectivity device may have stored all necessary login credentials such as a username and password, such that it is operative to establish the VPN connection 110 in a plug-and-play manner.

The VPN connection 110 may be, for example, an IPsec (Internet Protocol Security) secure network protocol suite connection. The IPsec protocol suite provides security for internet communication at the network layer by establishing a secure, encrypted connection between two devices, such as computers or routers, over the internet. IPsec consists of two main components; an Encapsulating Security Payload (ESP) and an Authentication Header (AH).

The ESP is used for encrypting and authenticating the data that is transmitted between the two devices and provides confidentiality, integrity, and authenticity of the data. The AH is used for authenticating the sender and the integrity of the data transmitted. However, the AH does not provide confidentiality, as this data is not encrypted.

IPsec can operate in two different modes, transport mode and tunnel mode. In transport mode, the IPsec security protocols are applied to the payload of an IP packet being transmitted, however the IP header is not encrypted or authenticated. In tunnel mode the entire IP packet, including the IP header and payload, is encrypted and authenticated. The encrypted IP packet is then encapsulated in a new IP packet and transmitted over the internet. Therefore, in the various embodiments, IPsec is used to secure a virtual private network (VPN) connection 110 as described further herein to protect against various cyber threats such as, for example, man-in-the-middle attacks and data interception by hackers.

In some embodiments, the VPN connection 110 may support IPv6 however the VPN connection may use IPv4 or IPv6. The VPC 113 includes an identification and authentication function 109 which provides an authenticated and labeled output 112 to a data endpoint 111. In some embodiments, the identification and authentication function 109 is program logic operative to add an ECC identifier to packet data received over the VPN connection 110 from the connectivity device, and to perform an authentication process to reliably identify the ECC and the data endpoint 111 which is an entity requesting access data or services. The VPC 113 is operative to act as a VPN server from the perspective of the connectivity device which acts as a VPN client.

In the various embodiments, an ECC identifier may be a unique identifier, or may include, or be a combination of, various source and destination variables such as, but not limited to, a Media Access Control (MAC) address, an IP address, a port number, an Ethernet frame, a network device identifier, hostname or domain name, etc. The ECC identifier, or components thereof, may be obtained partially or fully from the connectivity device, an ANI Controller, or another functional entity in the ECC CPE or may be another unique identifier unique to the ECC.

For example, a MAC address assigned to a network interface on a device such as the connectivity device, an ANI Controller, or another functional entity in the ECC CPE may be used. The MAC addresses may be 48 bits long expressed as a series of hexadecimal digits, separated by colons or hyphens. In another example, an IP address assigned to a device that is connected to the Internet such as, but not limited to, the connectivity device, an ANI Controller, or another functional entity in the ECC CPE may be used. An example IPv4 address is 32 bits long, expressed as a series of four decimal numbers, separated by dots, while an example IPv6 address is 128 bits long, expressed as a series of eight hexadecimal numbers, separated by colons. In another example, a port number is a 16-bit identifier that is used to identify a specific process or service on a device such as, but not limited to, the connectivity device, an ANI Controller, or another functional entity in the ECC CPE. The port numbers may be used in, as in IP networking practice, in combination with IP addresses to identify the endpoints of a communication session over the VPN connection 110. In another example, an Ethernet frame may be used where the Ethernet frame is a data packet used to transmit data over the ECC local area network (LAN). In this example, the Ethernet frame has a header that includes a destination MAC address of 48 bits length and a source MAC address of 48 bits length for a total of 96 bits length. In another example, a network device identifier of the connectivity device, an ANI Controller, or another functional entity in the ECC CPE may be used. These example network device identifiers are similar to the network device identifiers of devices such as switches and routers, etc. The length of these identifiers may vary, but they are at least 32 bits long. As noted above, the ECC identifier may be a combination of any of these examples and may either be, or include some other unique identification data.

The data endpoint 111 is an API endpoint and may be considered as the end of a communication channel between a functional entity at the CPE 101 and the VPC 113. As mentioned above, the functional entity may be an ANI Controller, etc. In that context, the data endpoint 111 may be considered an ANI/ALI API (application programming interface) endpoint which enables the VPN client implemented by the connectivity device to communicate with a virtual VPN server implemented in the VPC cloud 113. For example, the data endpoint 111, via an ANI/ALI API, may request resources from the VPN client side over the VPN connection 110.

The identification and authentication function 109 and the data endpoint 111 (and associated ANI/ALI API are operative to service multiple VPN connections where each VPN connection emanates from a different and distinct ECC having a unique ECC identifier. The identification and authentication function 109 is operative to attach or insert the appropriate ECC identifier into packet data it receives over each VPN connection. In some embodiments, the connectivity device 105 is operative to attach or insert the ECC identifier.

In some embodiments, the identification and authentication function 109 implements an Auth0 authentication between the connectivity device and the data endpoint 111 in the VPC 113. In one example implementation, the connectivity device sends an authentication request to the data endpoint 111, along with any necessary credentials for the ECC such as a username and password. The identification and authentication function 109 verifies the credentials and checks whether the connectivity device is authorized to access the data endpoint 111.

If the connectivity device is authorized, the data endpoint 111 sends a response back to the connectivity device, indicating that the authentication was successful. In some implementations, the response may also include a token or other information that the connectivity device can use to access the data endpoint 111 in the future.

If the connectivity device is not authorized, the identification and authentication function 109, on behalf of the data endpoint 111, sends a response back to the connectivity device, indicating that the authentication was unsuccessful. The connectivity device may then need to try again with different credentials.

In some embodiments, the ANI/ALI API may be a RESTful API in which each ECC VPN client may represent an endpoint from which the data endpoint 111 can obtain ANI/ALI data. The ANI/ALI API therefore may define at least one URL endpoint with a domain, port, path, and/or query string and within these definitions will be a unique ECC identifier. The VPC endpoints may be defined via IPv4 addresses (and ports) or via IPv6 addresses (and ports).

The data endpoint 111 also provides data, such as ANI/ALI data, to the emergency data management system 120 which may include one or more virtual servers, hardware servers, etc. as required to provide an SaaS (software-as-a-service) capability to the various ECCs such as a cloud-based application. The data management system 120 provides a web portal graphical user interface (GUI), web portal GUI 130, to one or more ECC workstations 119 of multiple ECCs. Each web portal GUI 130 executed on an ECC workstation corresponds to an instance of the cloud-based application provided by the emergency data management system 120. The web portal GUI 130 provides a map view with location indicators corresponding to emergency calls directed to the ECC (whether call routing is completed or not) and a call queue with ANI (called ID) data for each call, in addition to other data such as ADR (additional data repository) data, medical data, etc. from the additional data servers 117. This data may be directly related to ECC CAD incident form information for given CAD incident types. The web portal GUI 130 is provided and executed via a web socket connection 121 between a browser executing on the ECC workstation 119 and the emergency data management system 120 as a cloud-based application. The web socket connection 121 may be established as a persistent connection and run over the top of a TCP (Transmission Control Protocol) connection.

The emergency data management system 120 is operative to receive mobile device location data, and other emergency data, from various mobile location servers 115 and from additional data servers 117. The mobile location servers 115 receive hybrid location data from mobile devices via Internet connectivity and the data may include for example, but are not limited to, Android Mobile Location (AML) data, Android Emergency Location Service (ELS) data, and Hybridized Emergency Location (HELO) data provided by iOS™ devices, and other mobile device location data, etc. The emergency data management system 120 uses the data from the data endpoint 111 to identify emergency location data and other data associated with device identifiers (i.e. ANI/ALI data) and can match up data from the data endpoint 111 with other available emergency data to provide more complete and accurate information to the ECCs. The match up of data endpoint 111 data with data received by the emergency data management system 120 enables identification of emergency calls that have been routed to the ECC via telephony routing. However, the emergency data management system 120 information is not limited to emergency calls that have been routed to the ECC and the data obtained from the mobile location servers 115 and additional data servers 117 can be obtained by the emergency data management system 120 and provided to the web portal GUI 130 prior to the ECC receiving and answering the call.

Therefore, emergency data management system 120 is operative to provide an emergency call queue and a map view on the web portal GUI 130 that shows location indicators for devices from which emergency calls have emanated even before completion of the emergency call routing to the ECC. The ANI/ALI data is used by the emergency data management system 120 to distinguish call that have already been received by (i.e. routed to) the ECC and provide more detailed and useable data. The ANI/ALI data address, although often times not accurate and not used to actually dispatch emergency responders, is used as incident identification information in CAD incident records created in the ECC CAD system.

Because the identification and authentication function 109 (or the connectivity device 105) adds an ECC identifier to data it receives, likewise the emergency data management system 120 identifies that data, using the ECC identifier to push related data for the specific ECC to an appropriate ECC workstation (i.e. and ECC workstation that belongs to the specific ECC) via the web portal GUI 130.

The emergency data management system 120 may also determine which ECC should receive what data based on related mobile device location and whether a specific device that placed a call is located within an ECC geofence specified in a geofence database. Alternatively, where an ECC may not have a specified geofence in the geofence database, the emergency data management system 120 may use a reference source such as, but not limited to, a NENA PSAP Database Tool, for example the Enhanced Public Safety Answering Point (PSAP) Registry and Census (EPRC), which is a secure web-based tool that was developed in 2019 and which contains information for PSAPs throughout the United States.

The initial emergency call queue portion of the web portal GUI 130 may be displayed in various distinct colors, font styles, or using distinctive icons such that the call takers understand each entry in the queue and can also distinguish between incoming calls and calls that have been placed but not yet received.

As the emergency data management system 120 detects calls arriving at the ECC via the data endpoint 111 data it receives, or via the data it receives via the mobile location servers 115, the emergency data management system 120 can either change the call queue entry color, font style, or icon, etc. for queue entries related to calls that have been received by the ECC (or calls made but not yet routed or received at the ECC) such that the change appears on the web portal GUI 130.

In another implementation, the emergency data management system 120 can create a separate emergency call queue on the web portal GUI 130 that is specific to the ECC workstation on which it is displayed. The specific emergency call queue can display, for example, only emergency calls related to device identifiers received by the specific workstation.

Similarly, the map view provided by the web portal GUI 130 may display location indicators for devices from which emergency calls have emanated before completion of the emergency call routing to the ECC differently than location indicator for emergency calls that have been received at the ECC. The web portal GUI 130 may display location indicators in various distinct colors, using different font styles, or using distinctive icons such that the call takers understand each location point and can distinguish between incoming call locations and call that have been placed from a location but not yet received at the ECC.

The map view provided by the web portal GUI 130 may also display AVL data using various distinct colors, using different font styles, or using distinctive icons. For example, different icons may be used for police, fire, medical, or other types of emergency responder vehicles. The location indicators and AVL indicators may be displayable in a layer format in which a user of the web portal GUI 130 may turn layers on and off depending upon the operator's preferences or specific needs during handling a call or dispatch operations. The web portal GUI 130 may also provide an indication that additional data is available, such as data that may be important for a specific CAD incident type.

The data endpoint 111 may send data to the emergency data management system 120 in a streaming manner, or as a data push operation, as the data is obtained from the connectivity device. In response to receiving data from the data endpoint 111 whether sent in a data stream, as a push operation, or as a data query made via the web portal GUI 130 by a call taker/operator, the emergency data management system 120 provides, or returns in response to a query, emergency data which includes, but is not limited to, augmented device location information and other additional data. In some implementations, the ECC CAD system will include an integration enabling the CAD system to query the emergency data management system 120 to obtain mobile location information. In that case, the mobile location information from the emergency data management system 120 is displayed within a data field of the CAD system GUI in addition to the ANI/ALI data. The dispatcher accessing the CAD system GUI can then use the mobile location information from the emergency data management system 120 to dispatch emergency responders to the correct location.

Figure 2:
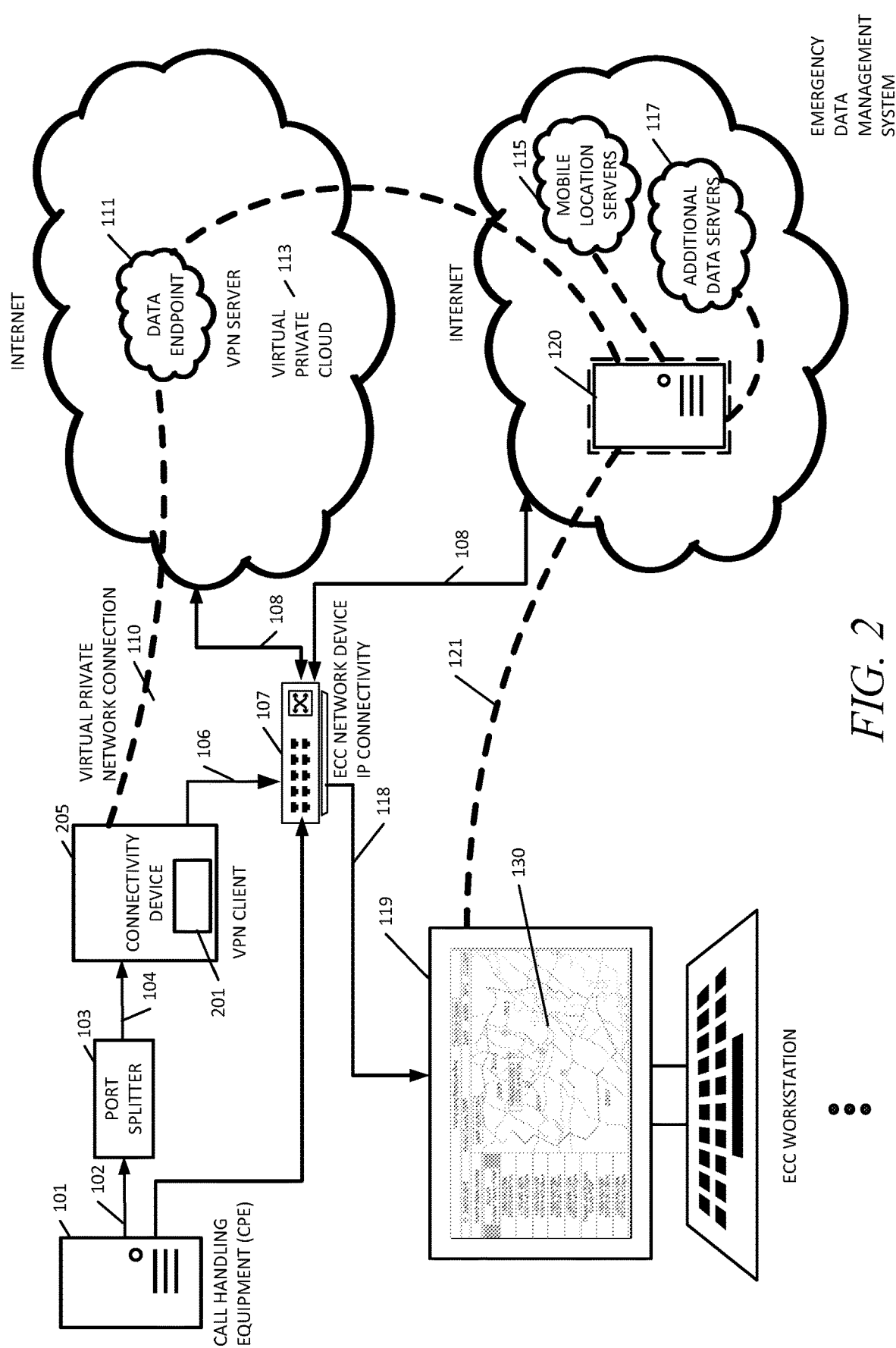
FIG. 2 is a block diagram of an ECC in communication with a virtual private cloud (VPC) infrastructure and with a software-as-a-service (SaaS) emergency data management system, in accordance with another embodiment. The ECC may be a Public Safety Answering Point (PSAP).

FIG. 2 is a block diagram of an ECC in communication with a virtual private cloud (VPC) infrastructure and with a software-as-a-service (SaaS) emergency data management system, in accordance with another embodiment. The FIG. 2 implementation operates similarly the implementation illustrated in FIG. 1, however the identification and authentication function 109 is eliminated in FIG. 2. Instead, the connectivity device 205 includes a processor 201 operative to, via executable instructions, add an ECC identifier to IP packets prior to sending the IP packets over the VPN connection 110. The connectivity device also includes a non-volatile, non-transitory memory component operative to store executable instructions for executing by the processor 201. For example, in some embodiments, a VPN client may be stored as executable code. Further, an authentication procedure, authentication tokens and login credentials may also be stored. In some embodiments, object-oriented programming code may be stored for execution by the processor 201.

The data endpoint 111 receives the IP packets directly from the VPN client aspect of the connectivity device 205. The operation of the emergency data management system 120 with respect to the data endpoint 111 is the same as in the FIG. 1 implementation. For example, the emergency data management system 120 may detect an identifier for the data endpoint 111. The API operating in the VPC 113 in this case directly handles the authentication aspect during initiation of the VPN connection 110. The VPC connection is established in the plug-and-play manner discussed above with respect to FIG. 1. The operation of the authentication for access to the data endpoint 111 may still be similar to the identification and authentication function 109 operation and may be an Auth0 authentication in some embodiments.

In one example of authentication for connecting with the data endpoint 111, after establishment of the VPN connection 110, the connectivity device 205 may send a request to the data endpoint 111 that includes an access token, which is a JWT (JSON Web Token) that contains information about the authenticated ECC such as the ECC identifier and other login credentials in some embodiments. The data endpoint 111 in the VPC 113 receives the request and verifies the access token, by checking the signature of the token to ensure that it has not been tampered with and that it was issued by a trusted source. If the access token is valid, the data endpoint 111 grants access to the requested resource or service and returns a response to the connectivity device 205. If the access token is invalid or has expired, the data endpoint 111 returns an error message to the connectivity device 205.

A JWT (JSON Web Token) sent by the connectivity device 205 may consist of a header, a payload, and a signature. The header may consist of the type of the token (i.e. JWT in some embodiments), and the signing algorithm being used, such as HMAC SHA256 or RSA. The token payload contains claims, for example registered, public, and private, which are statements about the ECC and additional data. The signature is for verification that the sender of the JWT is who it says it is and to ensure that the message wasn't altered in transit. The signature is created by taking the encoded header, the encoded payload, a secret, and the algorithm specified in the header, and signing it. The signature may be performed using a secret or a public/private key pair. Upon completion of this authentication process, the connectivity device 205 may then access the data endpoint 111 and begin sending data such as ANI/ALI data, AVL data, etc.

In some embodiments, in the implementation shown in either FIG. 1 or FIG. 2, the connectivity device or connectivity device may have stored in non-volatile, non-transitory memory, an authentication keyset. In some embodiments, the authentication keyset may be an OAuth (Open Authorization) keyset.

In some embodiments, the keyset may consist of two or more keys, such as but not limited to, a client key and a client secret. The client key is a public key that used to identify ECC that is requesting access to the data endpoint 111. The client secret is a private key that is used to authenticate the ECC and verify that it is authorized to access the data endpoint 111. In some embodiments, the connectivity device must present both the client key and the client secret to the data endpoint 111 during authentication. The identification and authentication function 109 in FIG. 1, or the data endpoint 111 directly in FIG. 2, will then verify the ECC credentials and, if the ECC is authorized, grant access to the data endpoint 111.

Therefore, in embodiments illustrate in both FIG. 1 and FIG. 2, authentication is used in connecting the connectivity device to the data endpoint 111 to provide a high level of security, by enabling secure access to the data endpoint 111 by verifying the ECC identity and ensuring that the ECC has the necessary permissions to access the data endpoint 111. Additionally, VPN connection 110 is used to create a secure, encrypted connection between the connectivity device and the VPC 113 over the internet, so as to protect the privacy and security of data being sent over the internet connection.

Figure 3:
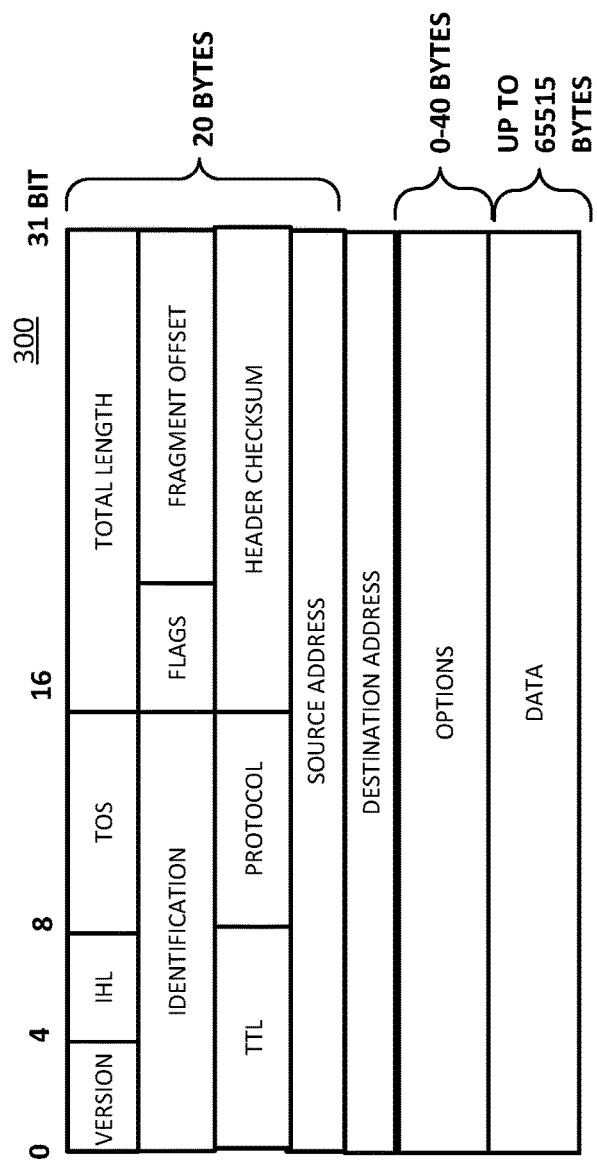
FIG. 3 is a bitmap diagram of an Internet Protocol version 4 (IPv4) packet header.
Figure 4:
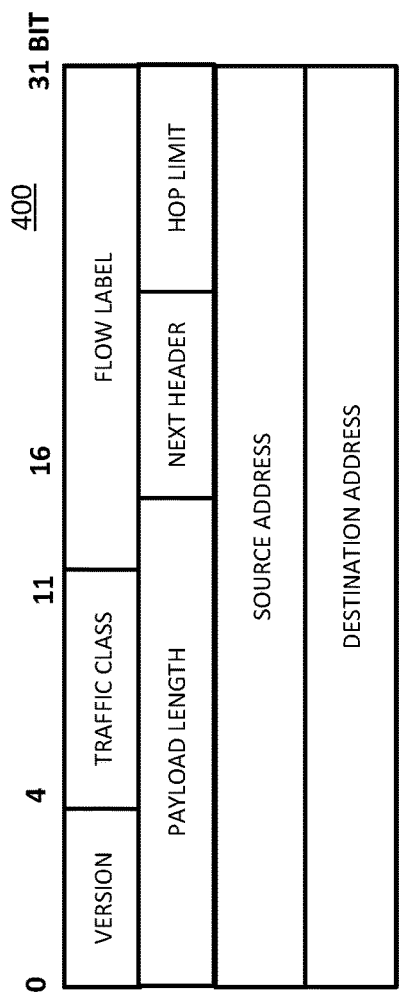
FIG. 4 is a bitmap diagram of an Internet Protocol version 6 (IPv6) packet header.

FIG. 3 is a bitmap diagram of an Internet Protocol version 4 (IPv4) packet header 300 and FIG. 4 is a bitmap diagram of an Internet Protocol version 6 (IPv6) packet header 400. Returning to FIG. 1, the identification and authentication function 109 may add an ECC identifier to either IPv4 or IPv6 packet headers for packet data it receives over the VPN connection 110 from the connectivity device. The ECC identifier may have a bit length depending upon the components of the ECC identifier as discussed above, which for example may include, or be a combination of, a Media Access Control (MAC) address, an IP address, a port number, an Ethernet frame, a network device identifier, or some other unique identification data etc.

In the implementation shown in FIG. 2, the connectivity device 205 adds the ECC identifier to either IPv4 or IPv6 packet headers for packet data it receives over the VPN connection 110 from a functional entity of the CPE 101, at various bit locations and within the packet header data fields as described below.

In the example IPv4 header 300 shown in FIG. 3, in some embodiments, the Type of Service (TOS) field, the Options field, or both have the ECC identifier added by the connectivity device. The TOS field is an 8-bit field that is used to differentiate different types of traffic and to provide a certain level of Quality of Service (QOS) to different packets. The Options field is a variable-length field that can be used to carry additional information that is not included in the fixed-length header. In other embodiments, the ECC identifier is inserted into the data field.

In the example IPv6 header 400 shown in FIG. 4, in some embodiments, the Traffic Class field, Flow Label field, extension headers, or some combination of these may have the ECC identifier added by the connectivity device. The Traffic Class field is an 8-bit field used to differentiate different types of traffic and to provide a certain Quality of Service (QOS) level to different packets. The Flow Label field is a 20-bit field used to identify a flow of packets that belong to the same session or connection.

IPv6 allows for the use of extension headers, which can be inserted between the IPv6 header and the upper-layer protocol header (e.g., TCP or UDP), and which can be used to carry additional information that is not included in the IPV6 header. In one example, the Hop-by-Hop Options header, which is used to carry options that are relevant to all nodes along the path of the packet, may have the ECC identifier added.

In the embodiments shown in FIG. 1 and FIG. 2, the identification and authentication function 109 or the connectivity device adds an ECC identifier to either IPv4 or IPv6 packet headers for packet data it receives over the VPN. The identification and authentication function 109 or the connectivity device are operative to detect the number of bits used in the various IP packet header fields to determine whether space is available to add in bits related to the ECC identifier. In some embodiments, the identification and authentication function 109 or the connectivity device are operative to use a form of bit stuffing.

Bit stuffing is a technique used in digital communication systems to ensure that a specific bit pattern, known as a flag, is not misinterpreted as data. In a general example of bit stuffing, a sender may transmit data and may insert additional bits into the data stream at certain intervals. These additional bits, are referred to as "stuffed bits," and are inserted in such that the receiver can identify them and remove them before interpreting the remaining bits as data. One application of bit stuffing is in protocols that require a flag to signal the beginning or end of a message, or to mark the beginning or end of a specific data field contained within a message. One specific example, is the High-Level Data Link Control (HDLC) protocol, in which a flag is used to mark the beginning and end of a frame, and bit stuffing ensures that the flag is not mistaken for data.

In the various embodiments, a form of bit stuffing may be used in that, a flag is used at the start and end of ECC identifier data, which may be contained at the beginning or end of one of the IPv4 or IPv6 packet header data fields discussed above. Put another way, the insertion of ECC identifier data may be formatted as: {"ECC start flag bits" "ECC identifier data" "ECC end flag bits" "Other data"}. The "other data" may itself contain bit start and end flag bits related to the specific data field. In some embodiments, the ECC identifier data may be inserted after flag bits of the specific field. For example, {"Header packet data field start flag bits" "ECC start flag bits" "ECC identifier data" "ECC end flag bits" "data field data" "Header packet data field end flag bits"}. In yet other embodiments, the ECC identifier bits may be inserted at the end of the data field after the "data field data" but prior to the "Header packet data field end flag bits."

In either FIG. 1 or FIG. 2, the connectivity device may use RESTful API HTTP methods such as GET, POST, PUT, and DELETE. However, the connectivity device may use the POST method to send ANI/ALI data, AVL data, or other data to the data endpoint 111 to create or update a resource. When the connectivity device sends a POST request to the data endpoint 111, it will normally be accompanied by a payload of data that is used to create or update the resource on the data endpoint 111. In some embodiments, the data may be in the form of a JSON object. In some embodiments, the data may be in XML format. The connectivity device may also use the PUT method to update an existing resource on the data endpoint 111. For example, the data endpoint 111 may send ANI/ALI updates via PUT when a mobile device in an emergency call changes locations, or for AVL data when an emergency responder vehicle changes locations, etc.

The emergency data management system 120 uses any of the RESTful API HTTP methods such as GET, POST, PUT, and DELETE to handle data at the date endpoint 111 and also to provide data to the web portal GUI 130 displayed on the ECC workstation 119.

Figure 5:
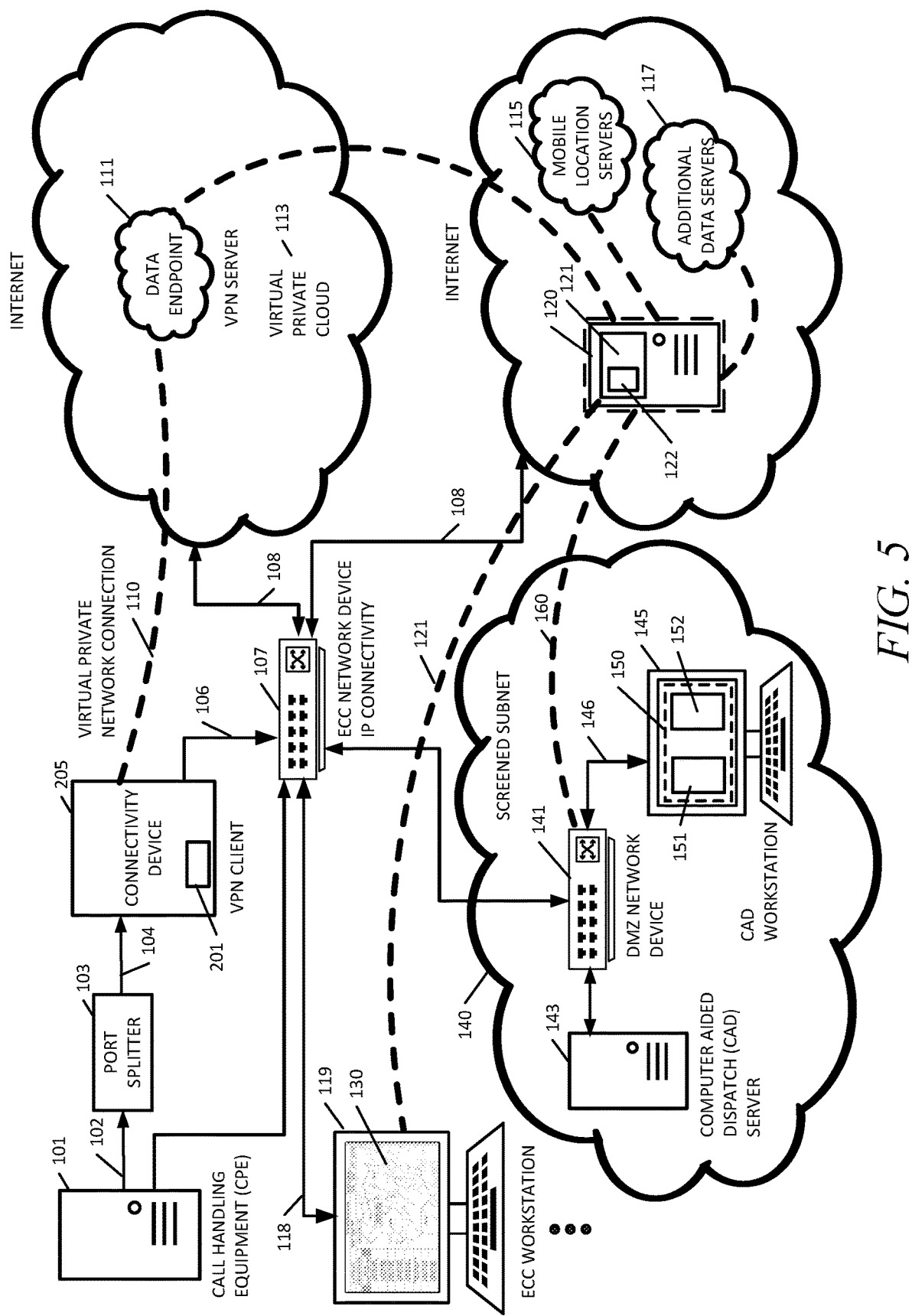
FIG. 5 is a block diagram of an ECC in communication with a connectivity device and using a VPN to communicate between a CAD system screened subnet and a software-as-a-service (SaaS) emergency data management system, in accordance with another embodiment. The ECC may be a Public Safety Answering Point (PSAP).

FIG. 5 is a block diagram of an ECC in communication with a connectivity device and using a VPN to communicate between a CAD system screened subnet and a software-as-a-service (SaaS) emergency data management system, in accordance with another embodiment. The ECC may be a Public Safety Answering Point (PSAP). In the FIG. 5 example implementation, the ECC includes a demilitarized zone (DMZ) also referred to a screened subnet 140. The screened subnet 140 includes the CAD system which further includes a CAD server 143, one or more CAD workstations 145, and at least one DMZ network device 141 which may be an internal router such as a choke router. In some ECC implementations, the ECC workstation 119 may have access to a CAD application provided by the CAD server 143 however a dedicated CAD workstation 145 may be used as shown in FIG. 5. In that case, the CAD workstation 145 may have restricted access to external websites and may be restricted to functions provided by the CAD server 143 with few exceptions. The CAD workstation 145 is operatively coupled to the screened subnet 140 via the DMZ network device 141 via connection 146. The DMZ network device 141 is operatively coupled to the ECC network device 107 to obtain restricted internet access and ECC network access.

In some implementations, the CAD workstation 145 will be enabled to access the emergency data management system 120 to display the web portal GUI 130. However, in some ECC implementations, only the ECC workstation 119, which is isolated from the screened subnet 140, may access the web portal GUI 130. The CAD workstation 145 displays a CAD GUI 150 which accesses a CAD application provided by the CAD server 143 in the DMZ. The CAD operator uses a CAD incident form 151 provided by the CAD GUI 150, to input CAD incident information. The CAD GUI 150 also provides a notes field 152 which accompanies, or is integrated with, the CAD incident form 151. Each CAD incident type will have a corresponding CAD incident form 151 that may also correspond to an incident type having an incident type code as described in the APCO International standard discussed above.

In accordance with the embodiments, the connectivity device 205 is operative to establish a connection to the screened subnet 140 to send data from the emergency data management system 120 to the CAD server 143. When a call taker receives an emergency call the call taker may select a "send to CAD" button on the web portal GUI 130 which will enable population of a data field, such as a notes field, with information obtained by the emergency data management system 120 pertaining to the incident. The call taker may then send the information to the CAD server for population of a CAD incident form 151. In some embodiments, the connection between the emergency data management system 120 and the screened subnet 140 is facilitated by a VPN established by the connectivity device 205 and the DMZ network device 141 to enable access to the CAD server 143. The connectivity device 205 establishes a TCP connection to the CAD server 143 and the emergency data management system 120 application can subsequently send data to the CAD server 143 using the TCP connection.

The call taker accessing the web portal GUI 130 will be able to see all data associated with an emergency call including mobile location data from the mobile location servers 115 (i.e. mobile hybrid location data, Android Mobile Location (AML) data, Android Emergency Location Service (ELS) data, Hybridized Emergency Location (HELO) data provided by iOS™ devices, and other mobile device location data, etc.) and data from the additional data servers 117 (such as, but not limited to, medical data, hazardous material data, or other incident type related data, etc.). This data collectively is referred to herein as "emergency data." The emergency data once entered into the CAD system becomes "CAD incident data." The call taker may select a "send to CAD" button in the web portal GUI 130 which enables the call taker to select portions of the emergency data to send to the CAD system. In some implementations, the emergency data management system 120 will, based on the nature of the emergency data, suggest what data should be sent within the web portal GUI 130 making it easier for the call taker to decide which data to send. In other words, the emergency data management system 120 will provide possible CAD incident types and may also display suggested CAD incident type codes for which the call taker can select emergency data to send.

After selection of the emergency data by the call taker, the emergency data is sent to the CAD server 143 and may be automatically entered into the relevant fields of the CAD incident form 151. Emergency data that does not have a specific CAD incident form 151 data field or that cannot be determined may be placed into the notes field 152.

In some embodiments, the emergency data management system 120 may include a machine learning or artificial intelligence (AI) module 122 executed by a processor 121 of the emergency data management system 120. The AI module 122 may be trained to determine a CAD incident types and CAD incident type code by assessing the emergency data associated with an emergency call. The AI module 122 is operative to retrieve the emergency data and send it to the CAD server 143 over a TCP connection to populate the relevant CAD incident form 151 and notes field 152 as required. For example, the notes field 152 may be used for mobile location data from the emergency data management system 120 among other types of data. The AI module 122 is operation to determine a CAD incident type based on it being trained using machine learning. The AI module 122 is also operative to populate a CAD incident form by selecting emergency data germane to the CAD incident type based on the AI module 122 being trained using machine learning.

Figure 6:
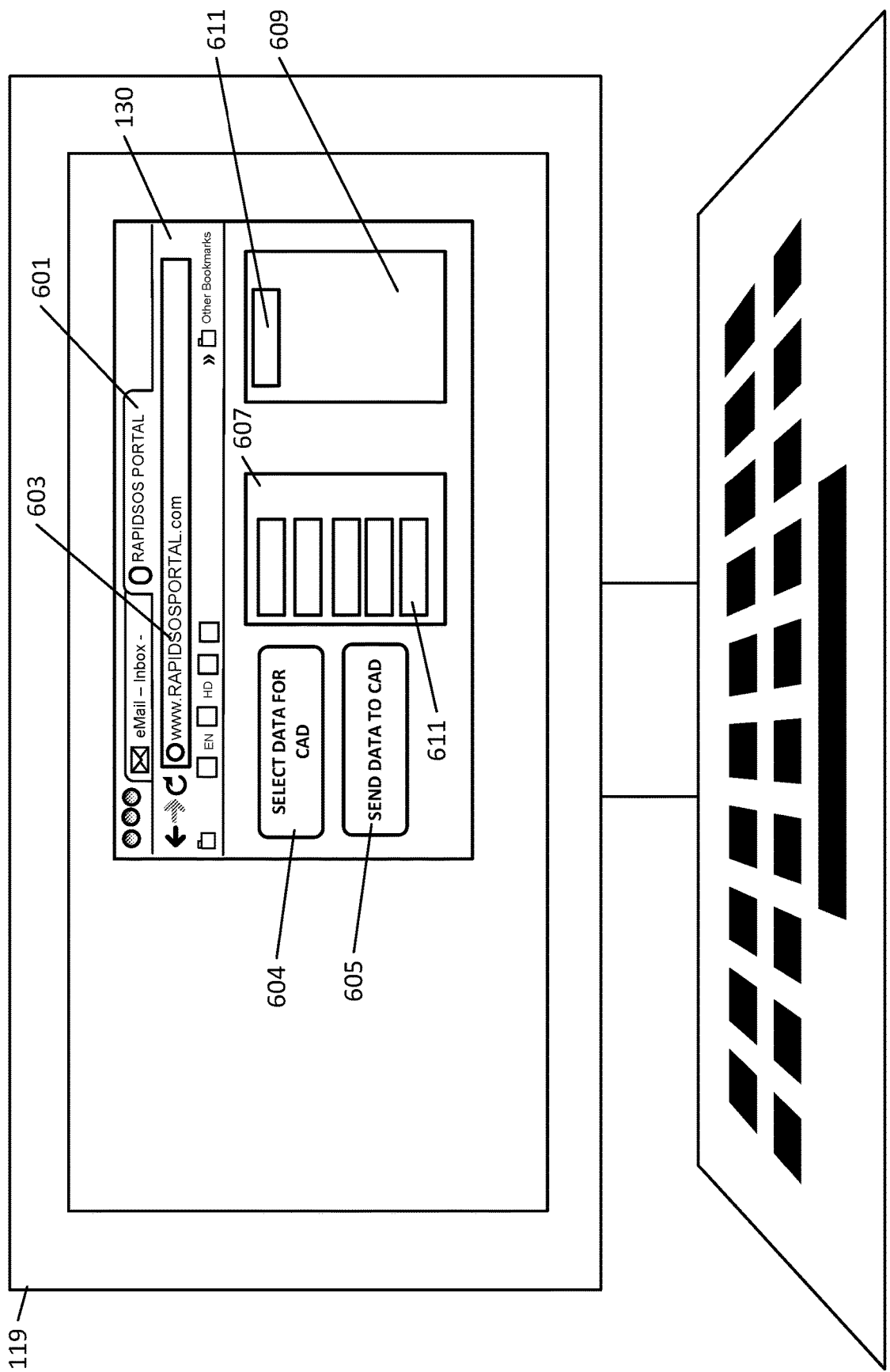
FIG. 6 is a diagram of an emergency data management system web portal GUI in accordance with some embodiments.

FIG. 6 is an example web portal GUI 130 showing selection of emergency data for sending to the ECC CAD system in accordance with some embodiments. The ECC call taker may view the web portal GUI 130 within a browser window 601 by entering the emergency data management system 120 URL into a web browser address field 603. After the call taker selects an entry from an emergency call queue, the web portal GUI 130 will display emergency data section 607 with emergency data available for that emergency call. The web portal GUI 130 may include a "SELECT DATA FOR CAD" button 605 that is selectable via a mouse cursor click. Once selected, the data fields within the emergency data section 607 will become selectable. In some embodiment, selection of a data field may automatically copy it to a "send data to CAD" section 609 to confirm selection of the emergency data. For example, data field 611 has been selected by the user and therefore has been copied into the "send data to CAD" section 609. In other implementations, the data fields such as data field 611, may be moved by a drag and drop operation using the mouse cursor. For example, data field 611 may be drag and dropped from the emergency data section 607 to the send data to CAD section 609. After the emergency data selection is completed, the call take may select the "SEND DATA TO CAD" button 605 via a mouse click to transmit the data via a TCP connection to the CAD server 143. The data will then populate the corresponding CAD incident form 151 and notes field 152 corresponding to the CAD incident. The emergency data management system 120 uses the ANI/ALI address as the CAD incident identifier and the ANI/ALI address is sent in the TCP connection along with the emergency data. This is because CAD systems use the ANI/ALI address of an emergency call as the identifier of the CAD incident. The ANI/ALI address is used to identify the CAD incident, even though the ANI/ALI address may not be used as the actual address to which emergency responders are dispatched. For mobile device emergency calls, the emergency responders are dispatched to the location provided by the emergency data management system 120. This information may show up in a specific defined field in the CAD incident form 151 or may show up in the notes field 152 depending on ECC preferences or the ECC specific configuration.

In some embodiments, the AI module 122 will highlight data fields in the emergency data section 607 based on the AI module 122 assessment of possible CAD incident types, however the call taker may accept or reject the suggested highlighted data fields or select other data fields that were not highlighted. In other embodiments, the AI module 122 automatically selects the emergency data relevant and sends it to CAD without requiring any user action by the call taker and without and need for call taker data entry.

In some situations, the emergency data may include a video which is provide by the emergency data management system 120 via a subdomain link or post domain link. In most ECCs, the subdomain will not be whitelisted by the ECC network, or within the screened subnet and therefore the ECC operators would be unable to access the video link to the subdomain. In this case, the emergency data management system 120 enables a zeri trust security model in which the subdomain address is verified by a credentials handshaking procedure. In some embodiments, the handshaking is implemented using a VPN established by the connectivity device 205 to the DMZ network device 141. Credentials are exchanged for the specific video link (i.e. the subdomain link) and this occurs in the background after a video link has been included in the emergency data sent to the CAD server 143 via the emergency data management system 120. Because the subdomain will be verified in this manner for each and every subdomain link sent to the CAD system, the CAD workstation 145 operator will be able to access the video using the link. The link may be a shortened URL and will only be available for a limited time period (for example, 30 or 60 minutes, etc.) to maintain security compliance in the screened subnet 140.

Figure 7:
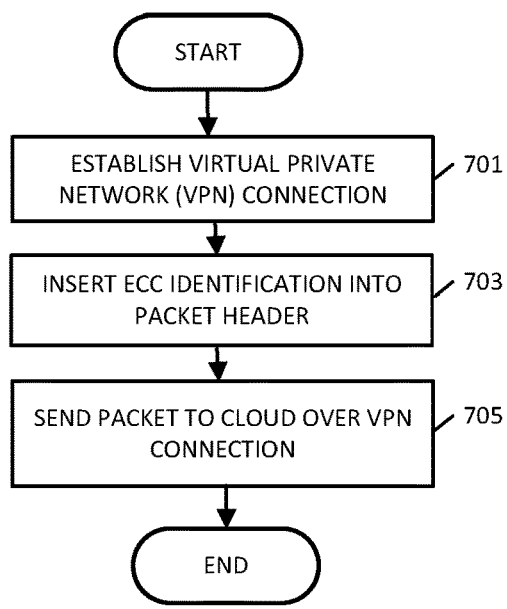
FIG. 7 is a flowchart of a method of operation for sending packet data from an Emergency Communications Center (ECC) in accordance with an embodiment.

FIG. 7 is a flowchart of a method of operation for sending packet data from an Emergency Communications Center (ECC) in accordance with an embodiment. The method of operation begins and at operation 701 the connectivity device establishes a VPN connection between the ECC network and the emergency data management system 120. The connectivity device inserts an ECC identifier into an IP packet header and sends the packet of information to the emergency management system 120 in the cloud via the VPN connection.

Figure 8:
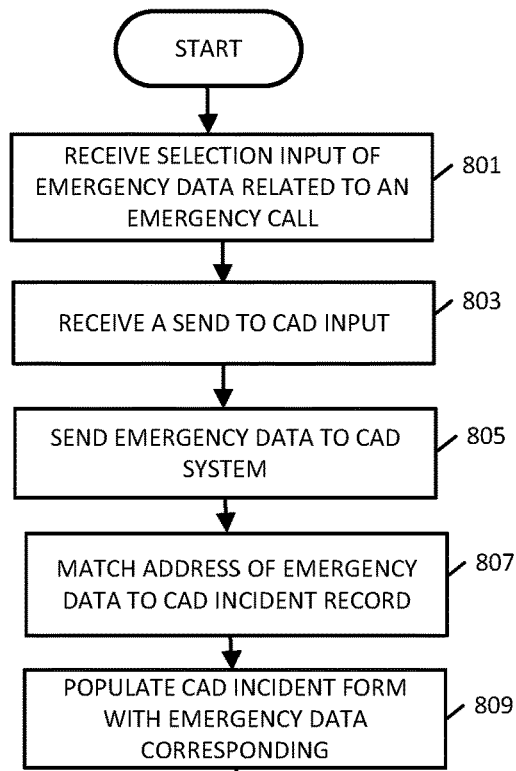
FIG. 8 is a is a flowchart of a method of operation for sending emergency data to an ECC CAD system in accordance with an embodiment.

FIG. 8 is a is a flowchart of a method of operation for sending emergency data to an ECC CAD system in accordance with an embodiment. The method of operation begins and at operation 801 the emergency data management system 120 receives selection input of emergency data related to an emergency call. The selection input is received via the web portal GUI 130. At operation 803, the emergency data management system receives an input from the web portal GUI 130 to send the emergency data to the ECC CAD system. At operation 805, the emergency data management system 120 sends the emergency data to the CAD system and at operation 807 communicates with the CAD system and looks for a CAD incident record (or CFS record) that has an address corresponding the incident address which is the address contained in the ANI/ALI data. At operation 809, the emergency data management system 120 uses a TCP connection to the CAD system to populate a CAD incident form with the emergency data.

Figure 9:
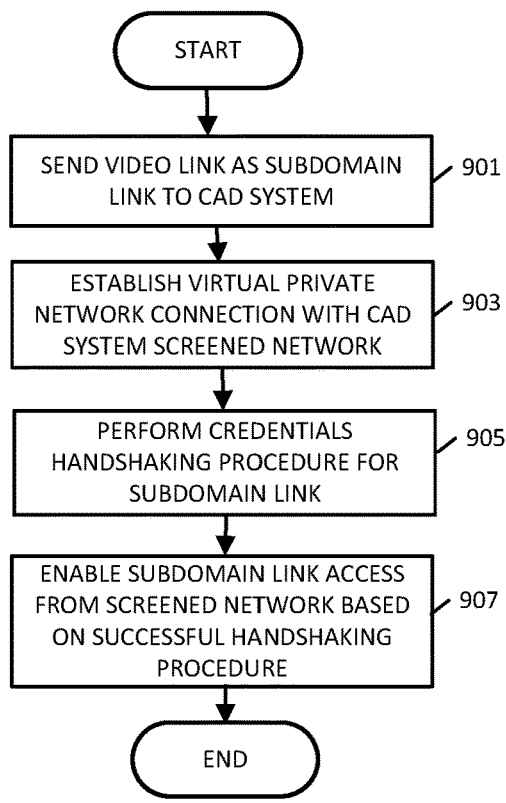
FIG. 9 is a is a flowchart of a method of operation for establishing credentials of a subdomain link for video transmission in a zero trust security model at an ECC in accordance with an embodiment.

FIG. 9 is a is a flowchart of a method of operation for establishing credentials of a subdomain link for video transmission in a zero trust security model at an ECC in accordance with an embodiment. The method of operation begins and at operation 901 the emergency data management system 120 sends emergency data to the CAD system including a video link which is a subdomain link of the emergency data management system 120. At operation 903, the connectivity device 205 establishes a VPN with the CAD system screened network 140 (i.e. the DMZ network) and at operation 905 performs a handshaking procedure to provide credentials for the subdomain link to the DMZ. At operation 907 the subdomain link can be accessed with the screened network 140 (DMZ) based on the successful handshaking procedure providing credentials. This method is performed each time a subdomain link is sent to the ECC CAD DMZ thereby implementing a zero trust security model at the ECC CAD DMZ.

Figure 10:
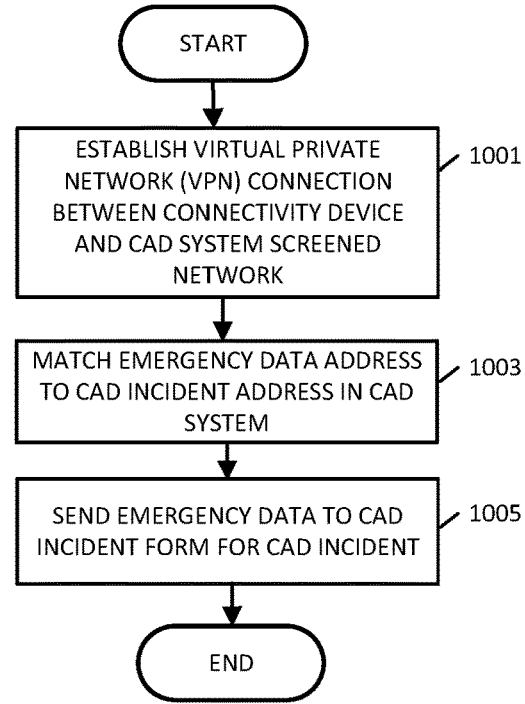
FIG. 10 is a is a flowchart of a method of operation for sending emergency data to an ECC CAD system in accordance with an embodiment.

FIG. 10 is a is a flowchart of a method of operation for sending emergency data to an ECC CAD system in accordance with an embodiment. The method begins and at operation 1001 the connectivity device establishes a VPN with the CAD system screened network 140. At operation 1003, the emergency data management system 120 matches an address obtained from the ANI/ALI data with an address of a CAD incident record (or CFS record) in the CAD system. At operation 1005, the emergency data management system 120 sends emergency data for the incident to the CAD incident form corresponding to the CAD incident record.

Figure 11:
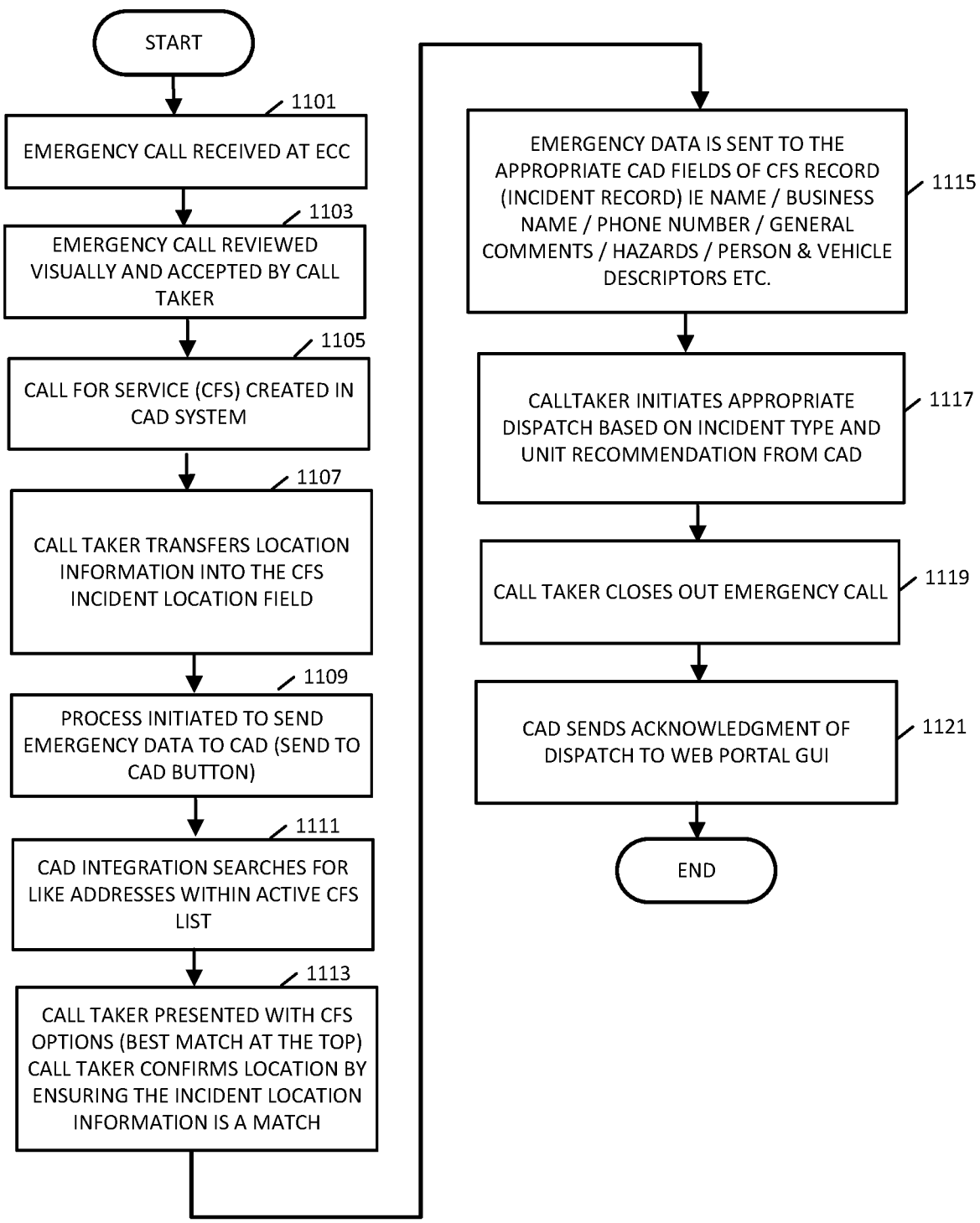
FIG. 11 is a is a flowchart of a method of operation for sending emergency data to an ECC CAD system in accordance with an embodiment.

FIG. 11 is a is a flowchart of a method of operation for sending emergency data to an ECC CAD system in accordance with an embodiment. The method of operation begins and at operation 1101 a call taker receives an emergency call at an ECC. The emergency call is displayed in a call queue and via a location indicator on a map view both shown within the web portal GUI 130. The emergency call may also be displayed within a GUI of a call handing software application provide by the ECC CPE. At operation 1103, the call taker visually reviews the emergency call and accepts the call. At operation 1105, a call for service (CFS) or CAD incident is created in the CAD system. At operation 1107, the call taker may transfer location information, and any other emergency data, into the CAD incident location field. For example, as shown in FIG. 6, the call taker may select emergency data from the emergency data section 607 to copy to the CAD data section 609. At operation 1108, the call taker may initiate a process to send the emergency data to the CAD system. For example, in FIG. 6 the call taker may select the "SEND DATA TO CAD" button 605. At operation 1111, the emergency data management system 120, via a CAD integration, searches for CAD incident records within the active CAD incident list (i.e. CFS record list) that matches the ANI/ALI address obtained by the emergency data management system 120 (via the connectivity device 205). At operation 1113, the call taker may be presented with a list of options within the web portal GUI 130 and may confirm which CAD incident location is correct (for example, by providing a selection input). At operation 1115, the emergency data management system 120 populates the appropriate data fields of a corresponding CAD incident form for the CAD incident type using the emergency data. At operation 1117, the call taker may initiate dispatch of first responders based on the incident type. At operation 1119, the call taker may close out the emergency call in the call handling system and in the web portal GUI 130. At operation 1121, in some embodiments, the CAD system may send an acknowledgement to the web portal GUI 130.

Figure 12:
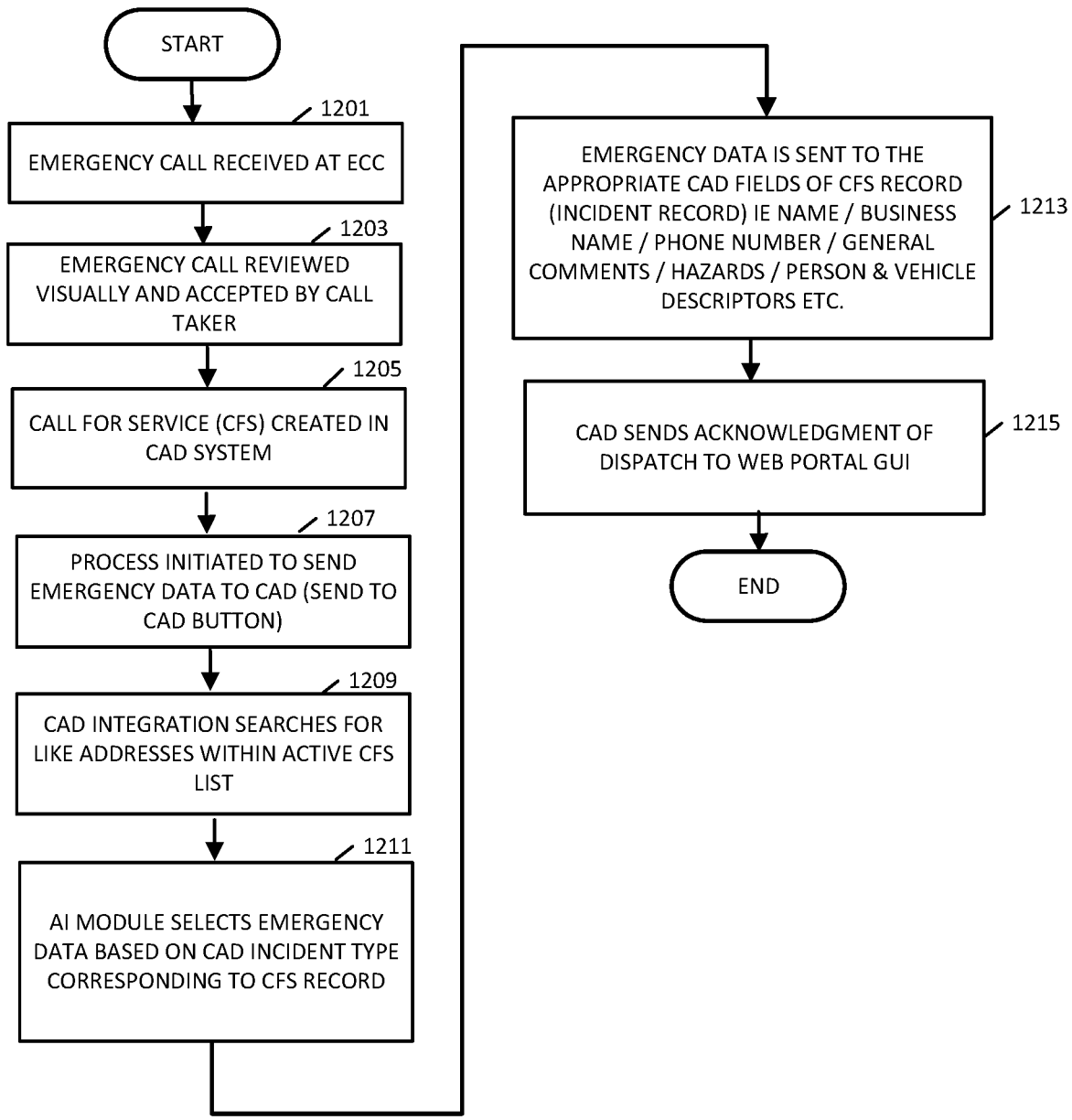
FIG. 12 is a flowchart of a method of operation for sending emergency data to an ECC CAD system in accordance with an embodiment.

FIG. 12 is a flowchart of a method of operation for sending emergency data to an ECC CAD system in accordance with an embodiment. The method of operation begins and at operation 1201 a call taker receives an emergency call at an ECC. The emergency call is displayed in a call queue and via a location indicator on a map view both shown within the web portal GUI 130. The emergency call may also be displayed within a GUI of a call handing software application provide by the ECC CPE. At operation 1203, the call taker visually reviews the emergency call and accepts the call. At operation 1205, a call for service (CFS) or CAD incident is created in the CAD system. At operation 1207, the call taker may initiate a process to send emergency data to the CAD system. For example, in FIG. 6 the call taker may select the "SEND DATA TO CAD" button 605. At operation 1209, the emergency data management system 120, via an AI module 122 searches for CAD incident records within the active CAD incident list (i.e. CFS record list) that matches the ANI/ALI address obtained by the emergency data management system 120 (via the connectivity device 205). At operation 1211, the AI module 122 selects emergency data to send based on an identified CAD incident type. At operation 1213, the AI module 122 populates the appropriate data fields of a corresponding CAD incident form for the CAD incident type using the emergency data. At operation 1215, in some embodiments, the CAD system may send an acknowledgement to the web portal GUI 130.

The cloud application provided by the emergency data management system 120 collects training data for the AI module 122 via the emergency data and CAD incidents generated for the corresponding emergency calls. This data is used in building a machine learning model. The machine learning model may also be trained using CAD incidents as defined by the APCO incident type standard discussed herein above. In some embodiments the AI module 122 is trained by machine learning algorithms subsequent to the machine learning algorithms evaluating appropriate amounts of emergency data after training on the CAD incident types and CAD incident forms for those CAD incident types.

The AI module 122 may be, in some example embodiments, a large language model (LLM) engine. The AI module 122 operations are based on machine learning and data collection and analysis by machine learning algorithms performed over a period of time. A non-volatile, non-transitory memory of the emergency data management system 120 stores artificial intelligence (AI) training data for this purpose. Specific models may be trained corresponding to a specific ECC based on the specific ECC's CAD incident forms. Machine learning models are generated and may be updated accordingly based on received input data.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method of operating an emergency data management system comprising:
   obtaining emergency data related to an emergency call to an emergency communication center (ECC) by a cloud server of the emergency data management system independent from the ECC;
   obtaining an address for the emergency call via a connectivity device located at the ECC, the connectivity device operatively coupled to the cloud server;
   matching the address to an ECC computer-aided-dispatch (CAD) system incident record address; and
   sending the emergency data to the ECC CAD system incident record corresponding to the matched CAD system incident record address.

2. The method of claim 1, further comprising:
   populating data fields of the CAD incident record using the emergency data related to the emergency call.

3. The method of claim 1, further comprising:
   establishing a virtual private network connection between the ECC and the emergency data management system.

4. The method of claim 1, further comprising:
   establishing a virtual private network connection between the connectivity device located at the ECC, and a screened network of the ECC.

5. The method of claim 1, further comprising:
   providing an instance of a cloud application by the emergency data management system to display the emergency data in a graphical user interface (GUI).

6. The method of claim 1, further comprising:
   receiving a command via the GUI to send the emergency data to the ECC CAD system; and
   sending the emergency data to the ECC CAD system in response to the command.

7. The method of claim 1, further comprising:
   establishing a TCP (transport control protocol) connection between the ECC CAD system and the emergency data management system.

8. The method of claim 1, further comprising:
   establishing a TCP (transport control protocol) connection between the ECC CAD system and the connectivity device located at the ECC.

9. The method of claim 1, further comprising:
   sending the emergency data to the ECC CAD system comprising a subdomain link to a subdomain of the emergency data management system.

10. The method of claim 9, further comprising:
    establishing a virtual private network (VPN) connection between the connectivity device located at the ECC, and a screened network of the ECC; and
    performing a handshaking procedure over the VPN connection to provide credentials for the subdomain link, to implement a zero trust security model for the subdomain link.

11. The method of claim 1, further comprising:
    populating data fields of the CAD incident record using the emergency data related to the emergency call, via a module trained using machine learning.

12. An emergency data management system comprising:
    a connectivity device, located at an emergency communication center (ECC) and operatively coupled to an ECC functional entity, operative to obtain an address for an emergency call from the ECC functional entity and send the address to the emergency data management system; and
    at least one cloud server, operatively coupled to the connectivity device to receive the address, and operative to:
      obtain emergency data related to the emergency call to the ECC independent from the ECC;
      match the address to an ECC computer-aided-dispatch (CAD) system incident record address; and
      send the emergency data to the ECC CAD system incident record corresponding to the matched CAD system incident record address.

13. The emergency data management system of claim 12, wherein the cloud server is further operative to:
    populate data fields of the CAD incident record using the emergency data related to the emergency call.

14. The emergency data management system of claim 12, wherein the cloud server is further operative to:
    establish a virtual private network connection between the ECC and the emergency data management system.

15. The emergency data management system of claim 12, wherein the connectivity device is further operative to:
    establish a virtual private network connection between the connectivity device located at the ECC, and a screened network of the ECC.

16. The emergency data management system of claim 12, wherein the cloud server is further operative to:
    provide an instance of a cloud application to the ECC to display the emergency data in a graphical user interface (GUI).

17. The emergency data management system of claim 12, wherein the cloud server is further operative to:
    receive a command via the GUI to send the emergency data to the ECC CAD system; and
    send the emergency data to the ECC CAD system in response to the command.

18. The emergency data management system of claim 12, wherein the cloud server is further operative to:
    establish a TCP (transport control protocol) connection to the ECC CAD system.

19. The emergency data management system of claim 12, wherein the connectivity device is further operative to:
    establish a TCP (transport control protocol) connection between the ECC CAD system and the connectivity device.

20. The emergency data management system of claim 12, wherein the cloud server is further operative to:
   send the emergency data to the ECC CAD system comprising a subdomain link to a subdomain of the emergency data management system.

21. The emergency data management system of claim 20, wherein the cloud server is further operative to:
   establish a virtual private network connection between the connectivity device located at the ECC, and a screened network of the ECC; and
   perform a handshaking procedure over the VPN connection to provide credentials for the subdomain link, to implement a zero trust security model for the subdomain link.

22. The emergency data management system of claim 12, further comprising:
   an artificial intelligence module operative to populate data fields of the CAD incident record using the emergency data related to the emergency call, the artificial intelligence module trained using machine learning.

* * * * *